US012228034B2

(12) United States Patent
Kilchyk et al.

(10) Patent No.: US 12,228,034 B2
(45) Date of Patent: Feb. 18, 2025

(54) ADDITIVELY MANUFACTURES MULTI-METALLIC ADAPTIVE OR ABRADABLE ROTOR TIP SEALS

(71) Applicant: Hamilton Sundstrand Corporation, Charlotte, NC (US)

(72) Inventors: Viktor Kilchyk, Lancaster, NY (US); Brent J. Merritt, Southwick, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 17/661,222

(22) Filed: Apr. 28, 2022

(65) Prior Publication Data

US 2023/0349299 A1 Nov. 2, 2023

(51) Int. Cl.
*F01D 11/18* (2006.01)
*F01D 5/14* (2006.01)

(52) U.S. Cl.
CPC ................ *F01D 11/18* (2013.01); *F01D 5/14* (2013.01); *F05D 2230/30* (2013.01)

(58) Field of Classification Search
CPC ... F01D 11/18; F01D 5/20; F01D 5/14; F05D 2230/30; F05D 2240/307
See application file for complete search history.

(56) References Cited

U.S. PATENT DOCUMENTS 1,857,961 A 5/1932 Lamb
3,908,361 A 9/1975 Gardiner
5,975,845 A 11/1999 Ball
6,206,642 B1 3/2001 Matheny et al.
7,423,236 B2 9/2008 Suh
7,578,509 B2 * 8/2009 Grondahl ................ F01D 11/02 277/303
7,695,248 B2 4/2010 Mons et al.
9,896,937 B2 2/2018 Dextraze
10,119,411 B2 11/2018 Dimova et al.
(Continued)

FOREIGN PATENT DOCUMENTS

CN 109519225 B 3/2020
EP 1914388 A1 * 4/2008 ............ F01D 11/001
(Continued)

OTHER PUBLICATIONS

Agilent Technologies, "Linear Thermal Expansion Coefficients of Metals and Alloys", 2002, Agilent Technologies, Laser and Optics User's Manual, p. 17-1 to 17-12 (Year: 2002).*
(Continued)

*Primary Examiner* — Woody A Lee, Jr.
*Assistant Examiner* — Eric A Lange
(74) *Attorney, Agent, or Firm* — Kinney & Lange, P.A.

(57) ABSTRACT

A rotor blade for a turbomachine includes a base, a tip opposite the base in a spanwise direction, a leading edge, and a trailing edge opposite the leading edge in a chordwise direction. A pressure surface extends from the leading edge to the trailing edge, and extends from the base to the tip. A suction surface extends from the leading edge to the trailing edge, and extends from the base to the tip. The tip includes a tip seal additively manufactured to the rotor blade. The tip seal includes a first portion with a first composition and a second portion with a second composition different from the first composition.

9 Claims, 6 Drawing Sheets

(56) References Cited

U.S. PATENT DOCUMENTS

| | | | | |
|---|---|---|---|---|
| 10,465,536 | B2 * | 11/2019 | Hewitt | F01D 11/12 |
| 2005/0058539 | A1 * | 3/2005 | Diakunchak | F01D 5/225<br>415/173.1 |
| 2013/0259640 | A1 | 10/2013 | Dimascio et al. | |
| 2014/0119920 | A1 * | 5/2014 | Coull | F01D 11/08<br>416/182 |
| 2015/0118079 | A1 * | 4/2015 | Dextraze | F01D 5/146<br>417/406 |
| 2018/0355732 | A1 * | 12/2018 | Hall | F01D 11/122 |
| 2020/0116160 | A1 | 4/2020 | Wang et al. | |
| 2023/0008935 | A1 * | 1/2023 | Yadav | F03G 7/0614 |

FOREIGN PATENT DOCUMENTS

| | | | | |
|---|---|---|---|---|
| EP | 1914389 | A1 | 4/2008 | |
| FR | 2738046 | A1 | 2/1997 | |
| JP | S5912102 | A | 1/1984 | |
| JP | S5918208 | A | 1/1984 | |
| JP | 2001200937 | A | 7/2001 | |
| JP | 2010270732 | A | 12/2010 | |
| WO | WO-2010137576 | A1 * | 12/2010 | F01D 17/165 |

OTHER PUBLICATIONS

Extended European Search Report dated Sep. 26, 2023, for corresponding European Patent Application No. 23170606.0.

* cited by examiner

ADDITIVELY MANUFACTURES MULTI-METALLIC ADAPTIVE OR ABRADABLE ROTOR TIP SEALS

BACKGROUND

The present disclosure relates to turbomachinery, and in particular, to tip clearances of a rotor blade in a turbomachine.

In turbomachines, which includes turbine engines, tip clearance refers to a distance between rotating components (such as turbine and/or compressor rotor blades) and stationary components (such as a case and/or shroud). Generally, there is a tip clearance between tips of rotor blades and an inner surface of the case or shroud to prevent rubbing between the two during operation. Efficiency of a turbomachine is increased by minimizing the distance between the rotor blades and the stationary components.

Minimizing the distance between the rotor blades and the stationary components increases efficiency of the turbomachine by reducing the percentage of core flow that leaks through the tip clearance. In the past, multiple attempts have been made to reduce tip clearances and improve turbomachine efficiency. These attempts include labyrinth seals and abradable coatings on the stationary components that are cut by the rotor blades.

SUMMARY

In one example, a rotor blade for a turbomachine includes a base, a tip opposite the base in a spanwise direction, a leading edge, and a trailing edge opposite the leading edge in a chordwise direction. A pressure surface extends from the leading edge to the trailing edge, and extends from the base to the tip. A suction surface extends from the leading edge to the trailing edge, and extends from the base to the tip. The tip includes a tip seal with a base end connecting the tip seal to the rotor blade and a distal end opposite the base end. The tip seal also includes a first side extending from the base end to the distal end and a second side opposite the first side and extending from the base end to the distal end. The tip seal further includes a first portion with a first composition and a second portion with a second composition different from the first composition.

In another example, a rotor blade for a turbomachine includes a base, a tip opposite the base in a spanwise direction, a leading edge, and a trailing edge opposite the leading edge in a chordwise direction. A pressure surface extends from the leading edge to the trailing edge, and extends from the base to the tip. A suction surface extends from the leading edge to the trailing edge, and extends from the base to the tip. The tip includes a tip seal additively manufactured to the rotor blade. The tip seal includes a first portion with a first composition and a second portion with a second composition different from the first composition.

Persons of ordinary skill in the art will recognize that other aspects and embodiments of the present invention are possible in view of the entirety of the present disclosure, including the accompanying figures.

Figure 1:
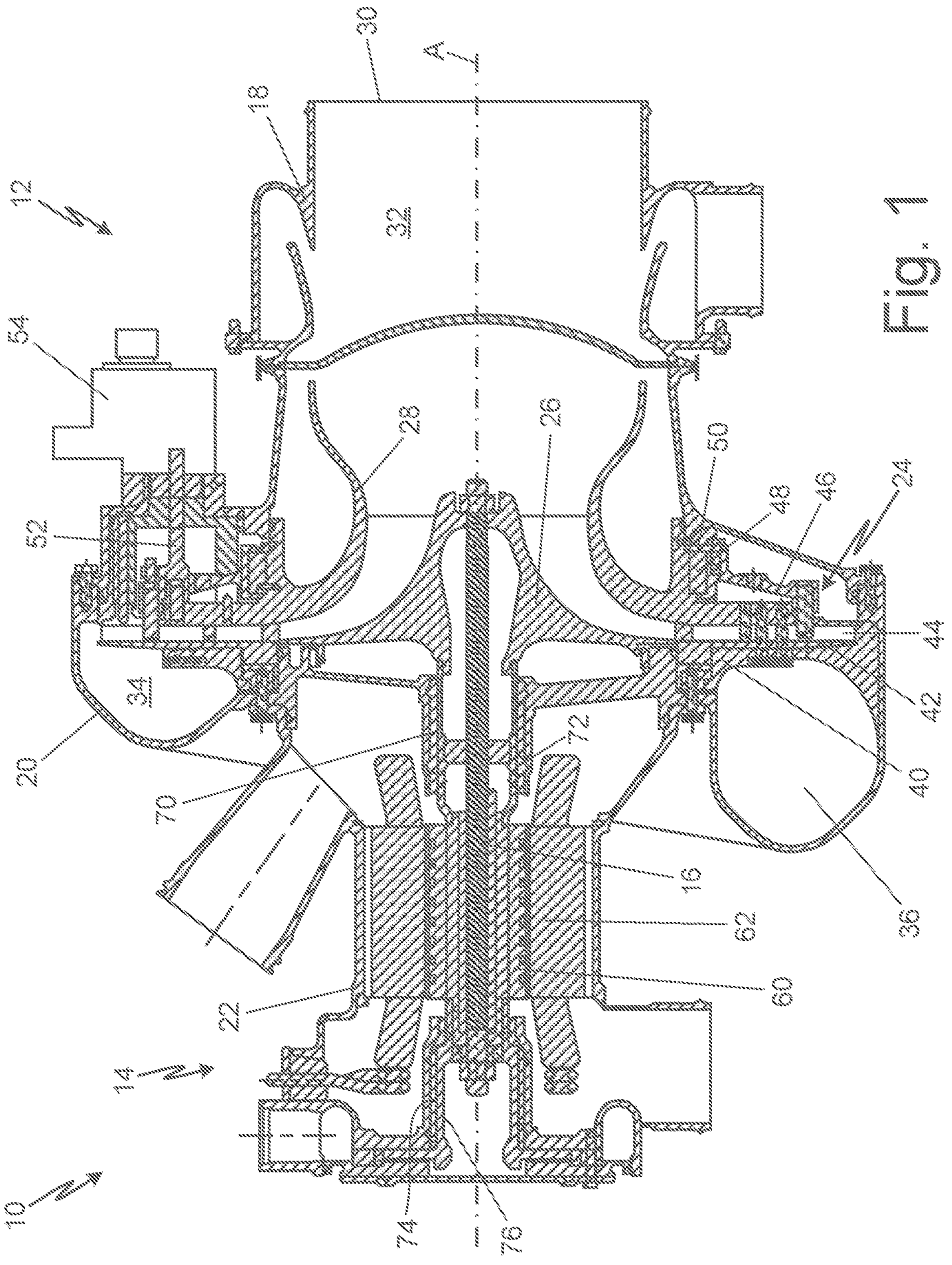
FIG. 1 is cross-sectional view of a cabin air compressor.

While the above-identified drawing figures set forth one or more embodiments, other embodiments are also contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings.

DETAILED DESCRIPTION

The disclosure provides a rotor blade with a tip seal having a bimetallic or multi-metallic composition. As discussed below with relation to the figures, the bimetallic or multi-metallic composition of the tip seal causes the tip seal to change height and reduce a gap between a tip of the rotor blade and a rotor shroud. Decreasing the gap between the rotor shroud and the rotor blade reduces the amount of flow that leaks over the tip of the rotor blade, which increases the amount of core flow that is acted upon by the rotor blade, thereby increasing the efficiency of the rotor blade. In other embodiments of the tip seal, the tip seal includes an elastic or soft material at a distal end of the tip seal to prevent undesirable rubbing and wear between the rotor blade and the rotor shroud. The tip seal can be additively manufactured as a retro-fit onto a pre-existing rotor blade or additively manufactured together with a new rotor blade.

FIG. 1 is a cross-sectional view of cabin air compressor 10. Cabin air compressor 10 includes compressor section 12, motor section 14, tie rod 16, compressor inlet housing 18, compressor outlet housing 20, motor housing 22, variable diffuser 24, rotor 26, and rotor shroud 28. Compressor inlet housing 18 includes inlet 30 and inlet duct 32. Compressor outlet housing 20 includes outlet duct 34 and outlet 36. Variable diffuser 16 includes backing plate 40, inboard plate 42, diffuser vanes 44, drive ring 46, drive ring bearing 48, backup ring 50, pinion 52, and variable diffuser actuator 54. Motor section 14 includes motor rotor 60 and motor stator 62. Cabin air compressor 10 further includes first journal bearing 70, first rotating shaft 72, second journal bearing 74, and second rotating shaft 76. FIG. 1 also shows axis A.

Compressor section 12 and motor section 14 are mounted on tie rod 16. Tie rod 16 is configured to rotate about axis A. Compressor inlet housing 18 and compressor outlet housing 20 of compressor section 12 are connected to one another. Motor housing 22 is connected to compressor outlet housing 20. Variable diffuser 24 is positioned between compressor inlet housing 18 and compressor outlet housing 20. Rotor 26 is positioned between compressor inlet housing 18 and compressor outlet housing 20. Rotor 26 is mounted on tie rod 316, which rotatably connects rotor 26 and motor section 14. Rotor shroud 28 is positioned radially outward from and partially surrounds compressor rotor 26.

Compressor inlet housing 18 includes inlet 30 and inlet duct 32. Inlet 30 is positioned at a first end of compressor inlet housing 18. Inlet duct 32 extends from inlet 30 through compressor inlet housing 18 to rotor 26. Compressor outlet housing 20 includes outlet duct 34 and outlet 36. Outlet duct 34 extends through compressor outlet housing 20 from rotor 26 to outlet 36.

Variable diffuser 16 includes backing plate 40, inboard plate 42, diffuser vanes 44, drive ring 46, drive ring bearing 48, pinion 50, backup ring 52, and variable diffuser actuator 54. Backing plate 40 abuts compressor outlet housing 20 on a first side and inboard plate 42 on a second side. Inboard plate 42 abuts backing plate 40 on a first side and diffuser vanes 44 on a second side. Diffuser vanes 44 abut inboard plate 42 on a first side and rotor shroud 28 on a second side. Diffuser vanes 44 are configured to direct the compressed air from rotor 26 into outlet duct 34. Drive ring 46 is positioned radially outward from rotor shroud 28, and drive ring bearing 48 is positioned between driver ring 46 and rotor shroud 28. Drive ring 46 abuts rotor shroud 28 on a first side and backup ring 50 on a second side. Backup ring 50 is positioned radially outward of rotor shroud 28. Pinion 52 is connected to variable diffuser actuator 54 and is coupled to drive ring 46. Pinion 52 permits control of variable diffuser 16. Drive ring 46 is coupled to diffuser vanes 44 with pins, and as drive ring 46 is rotated drive ring 46 will drag diffuser vanes 44 and cause them to rotate.

Motor section 14 includes motor housing 22, motor rotor 60, and motor stator 62. Motor housing 22 surrounds motor rotor 60 and motor stator 62. Motor rotor 60 is disposed within motor stator 62 and is configured to rotate about axis A. Motor rotor 60 is mounted to tie rod 16 to drive rotation of tie rod 16.

Motor rotor 60 of motor section 14 drives rotation of shafts in cabin air compressor 10, which rotates rotor 26. The rotation of rotor 26 draws air into inlet 30 of compressor inlet housing 18. The air flows through inlet duct 32 to rotor 26 and will be compressed by rotor 26. The compressed air is then routed through variable diffuser 16 and into outlet duct 34 of compressor outlet housing 20. The air then exits cabin air compressor 10 through outlet 36 of compressor outlet housing 20 and can be routed to another component of an environmental control system, such as an air cycle machine.

Cabin air compressor 10 further includes first journal bearing 70, first rotating shaft 72, second journal bearing 74, and second rotating shaft 76. First journal bearing 70 is positioned in compressor section 12 and is supported by compressor outlet housing 20. First rotating shaft 72 extends between and rotates with rotor 26 and motor rotor 60. Motor rotor 60 drives rotation of rotor 26 with first rotating shaft 72. A radially outer surface of first rotating shaft 72 abuts a radially inner surface of first journal bearing 70. Second journal bearing 74 is positioned in motor section 14 and is supported by motor housing 22. Second rotating shaft 76 extends from and rotates with motor rotor 60. A radially outer surface of second rotating shaft 76 abuts a radially inner surface of second journal bearing 74. Rotor 26 is discussed in greater detail below with reference to FIGS. 2 and 3.

Figure 2:
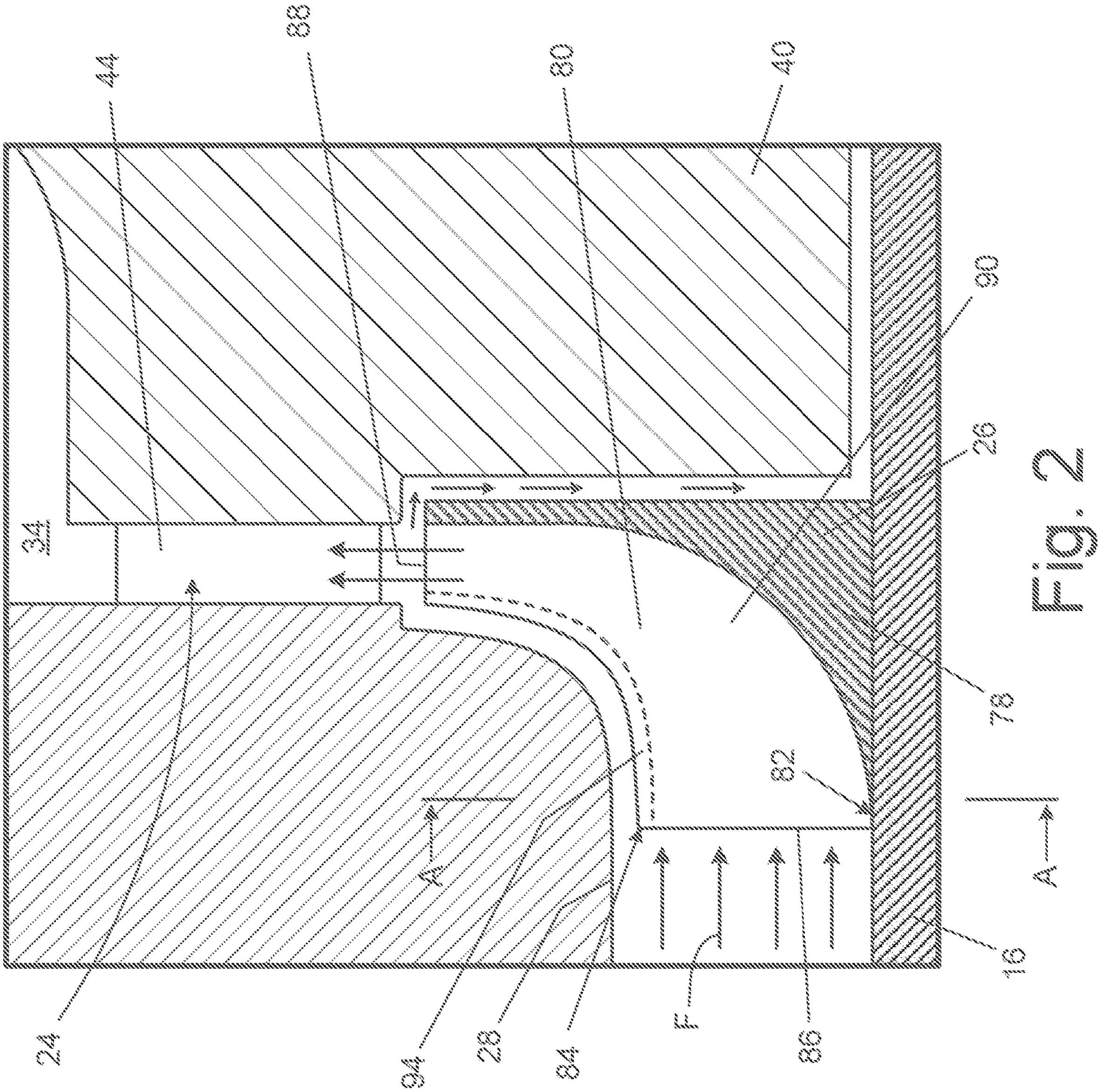
FIG. 2 is cross-sectional schematic diagram of a rotor and a rotor shroud of the cabin air compressor of FIG. 1.
Figure 3:
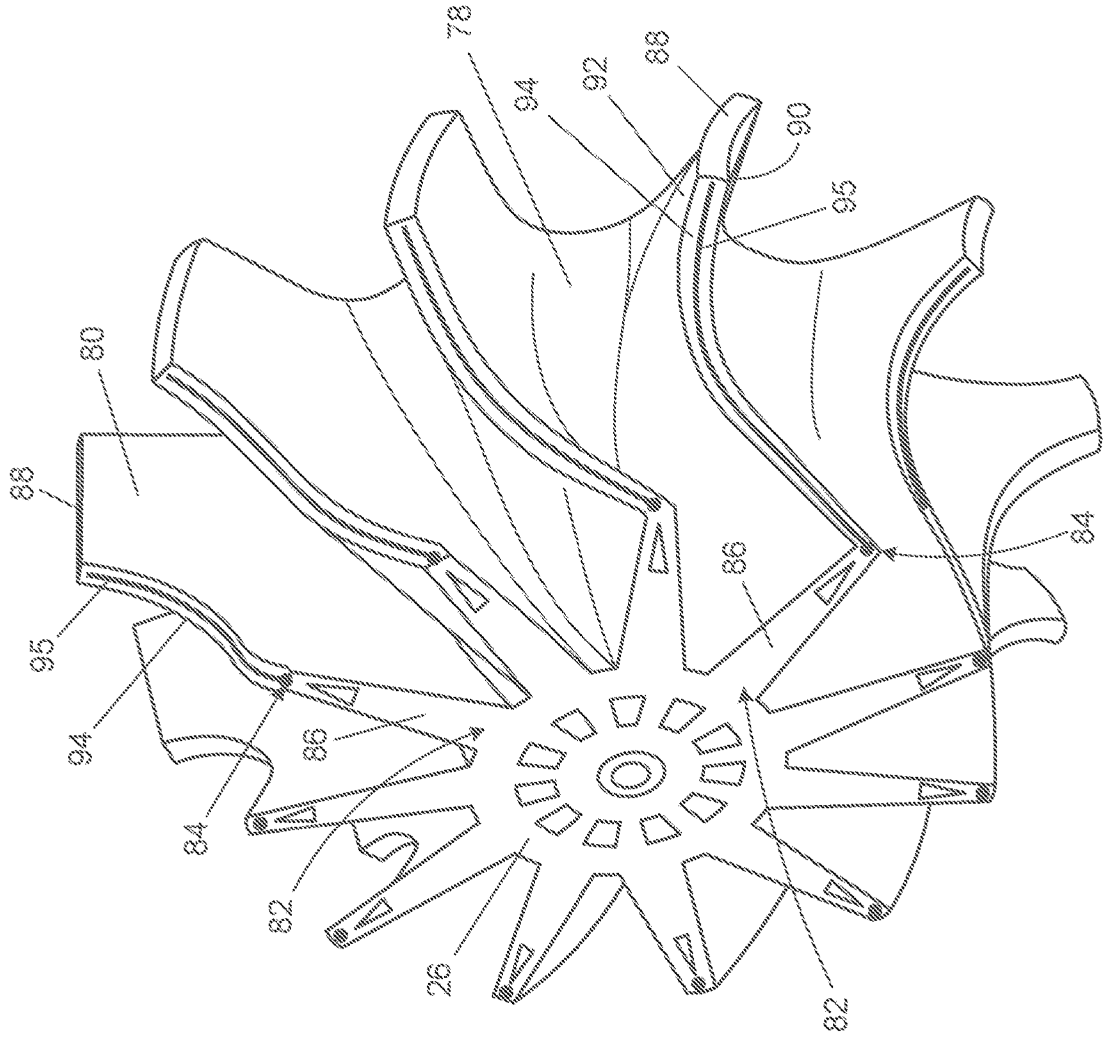
FIG. 3 is a perspective view of the rotor from FIG. 2.

FIGS. 2 and 3 will be discussed concurrently. FIG. 2 is a simplified cross-sectional schematic diagram of rotor 26 and rotor shroud 28 of cabin air compressor 10 of FIG. 1. FIG. 3 is a perspective view of rotor 26 from FIG. 2. As shown in FIGS. 2 and 3, rotor 26 comprises hub 78 and rotor blades 80 extending from hub 78. Each rotor blade 80 includes base 82, tip 84, leading edge 86, trailing edge 88, pressure surface 90, suction surface 92, tip seals 94, and channel 95.

Rotor 26, as shown in FIGS. 2 and 3, is an impeller with each rotor blade 80 transitioning from an axial flow path at leading edge 86 to a radial flow path at trailing edge 88. Each rotor blade 80 extends from base 82 to tip 84 in a spanwise direction and extends from leading edge 86 to trailing edge 88 in a chordwise direction. Trailing edge 88 is downstream and opposite from leading edge 86 relative core flow F of cabin air compressor 10. Both leading edge 86 and trailing edge 88 extend from base 82 to tip 84. Pressure surface 90 extends from leading edge 86 to trailing edge 88 and extends from base 82 to tip 84 of rotor blade 80. Suction surface 92 (shown in FIG. 3) also extends from leading edge 86 to trailing edge 88 and extends from base 82 to tip 84 of rotor blade 80.

Each rotor blade 80 of the embodiment of FIGS. 2 and 3 includes a pair of tip seals 94. Tip seals 94 form tip 84 of rotor blade 80 and extend from leading edge 86 to trailing edge 88 of rotor blade 80. Channel 95 is formed in tip 84 of rotor blade 80 and extends from leading edge 86 to trailing edge 88 between tip seals 94. As discussed below with reference to FIGS. 4A and 4B, tip seals 94 increase the efficiency of rotor blade 80 by reducing a gap between tip 84 and rotor shroud 28.

Figure 4B:
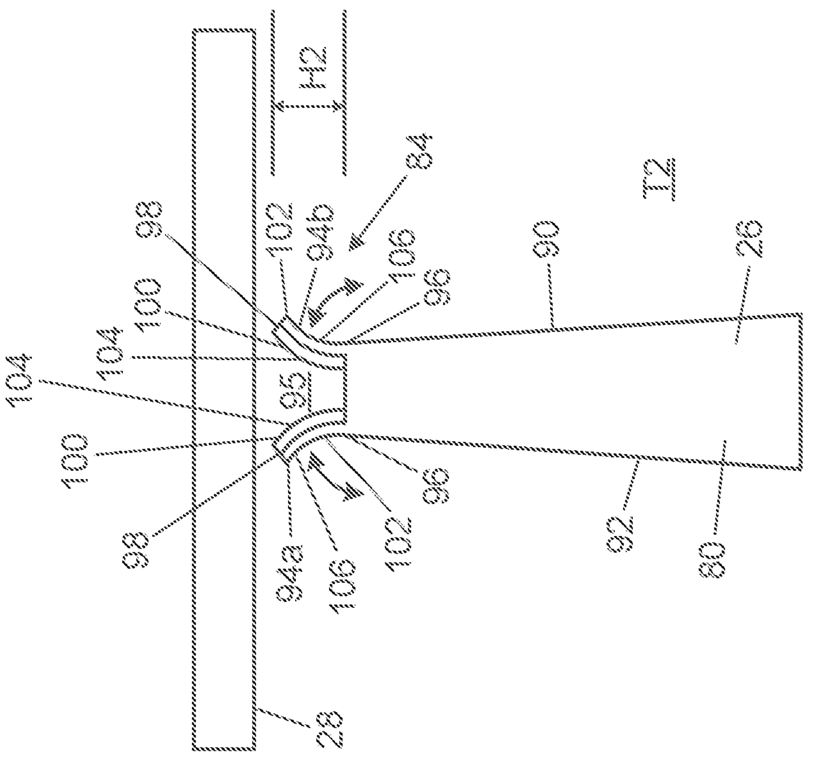
FIG. 4B is a cross-sectional view of the rotor and the rotor shroud of FIG. 2 taken along line A-A and at a second temperature.
Figure 4A:
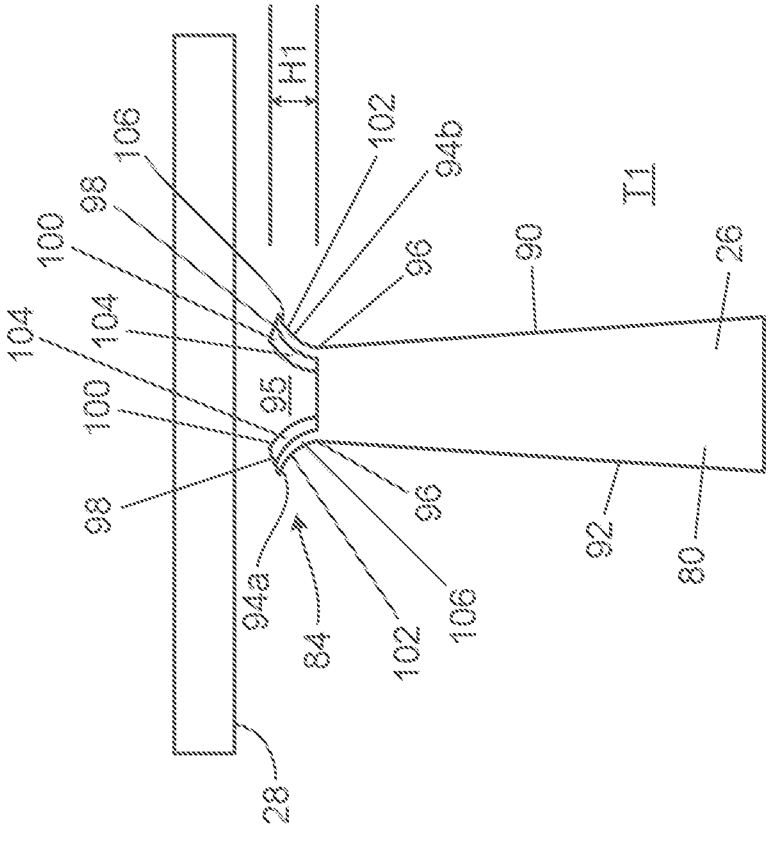
FIG. 4A is a cross-sectional view of the rotor and the rotor shroud of FIG. 2 taken along line A-A and at a first temperature.

FIGS. 4A and 4B will be discussed concurrently. FIG. 4A is a cross-sectional view of rotor 26 and rotor shroud 28 of FIG. 2 taken along line A-A and at first temperature T1. FIG. 4B is a cross-sectional view of rotor 26 and rotor shroud 28 of FIG. 2 taken along line A-A and at second temperature T2. As shown in FIGS. 4A and 4B, rotor blade 80 of rotor 26 includes first tip seal 94*a* and second tip seal 94*b*. First tip seal 94*a* and second tip seal 94*b* each includes base end 96, distal end 98, first side 100, second side 102, first portion 104, and second portion 106. First tip seal 94*a* and second tip seal 94*b* each includes first height H1 when at first temperature T1 and second height H2 when at second temperature T2.

First tip seal 94*a* and second tip seal 94*b* have a similar arrangement to each other. Both first tip seal 94*a* and second tip seal 94*b* are connected to rotor blade 80 by base end 96. Distal end 98 is opposite base end 96 such that each of first tip seal 94*a* and second tip seal 94*b* extends from base end 96 to distal end 98. First side 100 of first tip seal 94*a* and second tip seal 94*b* extends from base end 96 to distal end 98. Second side 102 of first tip seal 94*a* and second tip seal 94*b* is opposite respective first side 100 and extends from base end 96 to distal end 98. Both first side 100 and second side 102 for each of tip seals 94 can extend from leading edge 86 to trailing edge 88 of rotor blade 80. In the embodiment of FIGS. 4A and 4B, first side 100 for both first tip seal 94*a* and second tip seal 94*b* is convex and second side 102 for both first tip seal 94*a* and second tip seal 94*b* is concave. Second side 102 of first tip seal 94*a* is adjacent to and continuous with suction surface 92 of rotor blade 80. Second side 102 of second tip seal 94*b* is adjacent to and continuous with pressure surface 90 of rotor blade 80. Channel 95 extends on tip 84 between first tip seal 94*a* and second tip seal 94*b*. First side 100 of first tip seal 94*a* faces first side 100 of second tip seal 94*b* with channel 95 therebetween.

First tip seal 94*a* and second tip seal 94*b* each includes first portion 104 with a first metallic composition and second portion 106 with a second metallic composition that is different from the first composition. In the embodiment of FIGS. 4A and 4B, first side 100 for both first tip seal 94*a* and second tip seal 94*b* is formed by first portion 104 with the first composition. Second side 102 for both first tip seal 94*a* and second tip seal 94*b* is formed by second portion 106 with the second composition. In both first tip seal 94*a* and second tip seal 94*b*, first portion 104 is joined with second portion 106 to form a curved bimetallic strip or multi-metallic strip. The first composition of first portion 104 has a first coefficient of thermal expansion and the second composition of second portion 106 has a second coefficient of thermal expansion that is greater than the first coefficient of thermal expansion. With second portion 106 having a greater coefficient of thermal expansion than first portion 104, first tip seal 94*a* and second tip seal 94*b* will at least partially straighten and increase in height from first height H1 to second height H2 as the temperature across rotor blades 80 increases from first temperature T1 to second temperature T2. As first tip seal 94*a* and second tip seal 94*b* increase in height from first height H1 to second height H2, distal end 98 for each of first tip seal 94*a* and second tip seal 94*b* moves closer to rotor shroud 28 and reduces the gap between rotor blade 80 and rotor shroud 28. Decreasing the gap between rotor shroud 28 and rotor blades 80 reduces the amount of core flow F that leaks over tip 84 which increases the amount of core flow that is acted upon by rotor blades 80, which results in increased efficiency of cabin air compressor 10. First temperature T1 can be the temperature of rotor 26 at start-up. Second temperature T2 can be the temperature of rotor 26 during steady-state operation of rotor 26, which is a higher temperature than first temperature T1. In addition to reducing the gap between tips 84 of rotor blades 80 and rotor shroud 28, the change in shape of first tip seal 94*a* and second tip seal 94*b* between first temperature T1 and second temperature T2 may counteract unwanted deformation by the centrifugal forces that act on rotor blades 80 as rotor 26 rotates.

First tip seal 94*a* and second tip seal 94*b* can be additively manufactured onto rotor blade 80 after rotor blade 80 has been formed via machining. Alternatively, first tip seal 94*a*, second tip seal 94*b*, and the rest of blade 80 can be formed together via additive manufacturing. In another embodiment, first portion 104 or second portion 106 can be formed from a memory-shape alloy that increases in height when heated but decreases in height when cooled due to a thermal response of the other portion connected to the portion with the memory-shape alloy. Examples of memory-shape alloy that can be used in first portion 104 or second portion 106 include but are not limited to copper-aluminum-nickel alloys, nickel-titanium alloys, and other shape-memory alloys.

Figure 5:
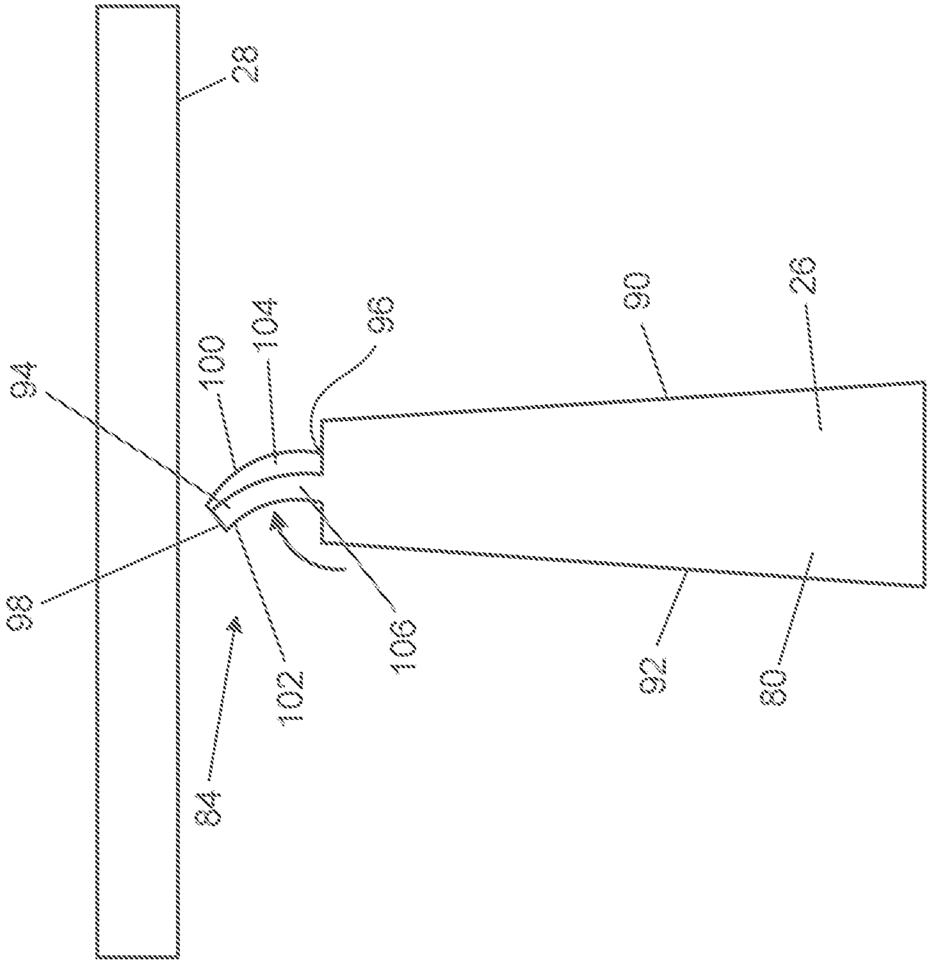
FIG. 5 is a cross-sectional view of another embodiment of the rotor and the rotor shroud.

FIG. 5 is a cross-sectional view of another embodiment of rotor 26 and rotor shroud 28. In the embodiment of FIG. 5, tip 84 of each rotor blade 80 of rotor 26 includes a single tip seal 94. Similar to the embodiment of FIGS. 4A and 4B, tip seal 94 in FIG. 5 includes base end 96, distal end 98, first side 100, second side 102, first portion 104, and second portion 106. Tip seal 94 is connected to rotor blade 80 by base end 96, and distal end 98 is opposite base end 96 such that tip seal 94 extends from base end 96 to distal end 98. First side 100 of tip seal 94 extends from base end 96 to distal end 98. Second side 102 of tip seal 94 is opposite first side 100 and extends from base end 96 to distal end 98. Both first side 100 and second side 102 can extend from leading edge 86 to trailing edge 88 of rotor blade 80. In the embodiment of FIG. 5, first side 100 of tip seal 94 is convex and second side 102 is concave.

Similar to the embodiment of FIGS. 4A and 4B, tip seal 94 in FIG. 5 includes first portion 104 with a first metallic composition and second portion 106 with a second metallic composition that is different from the first composition. First side 100 of tip seal 94 is formed by first portion 104 with the first composition. Second side 102 of tip seal 94 is formed by second portion 106 with the second composition. First portion 104 is joined with second portion 106 to form a curved bimetallic strip or multi-metallic strip. The first composition of first portion 104 has a first coefficient of thermal expansion and the second composition of second portion 106 has a second coefficient of thermal expansion that is greater than the first coefficient of thermal expansion. With second portion 106 having a greater coefficient of thermal expansion than first portion 104, tip seal 94 will at least partially straighten and increase in height as the temperature across rotor blades 80 increases from first temperature T1 to second temperature T2. As tip seal 94 increase in height, distal end 98 of tip seal 94 moves closer to rotor shroud 28 and reduces the gap between rotor blade 80 and rotor shroud 28. Decreasing the gap between rotor shroud 28 and rotor blades 80 reduces the amount of core flow F that leaks over tip 84 which increases the amount of core flow that is acted upon by rotor blades 80, which results in increased efficiency of cabin air compressor 10. In addition to reducing the gap between tips 84 of rotor blades 80 and rotor shroud 28, the change in shape of tip seal 94 between first temperature T1 and second temperature T2 may counteract unwanted deformation by the centrifugal forces that act on rotor blades 80 as rotor 26 rotates.

Tip seal 94 can be additively manufactured onto rotor blade 80 after rotor blade 80 has been formed via machining. Alternatively, tip seal 94 and the rest of blade 80 can be formed together via additive manufacturing. In another embodiment, first portion 104 or second portion 106 can be formed from a memory-shape alloy that increases in height when heated but decreases in height when cooled due to a thermal response of the other portion connected to the portion with the memory-shape alloy. Examples of memory-shape alloy that can be used in first portion 104 or second portion 106 include but are not limited to copper-aluminum-nickel alloys, nickel-titanium alloys, and other shape-memory alloys.

Figure 6:
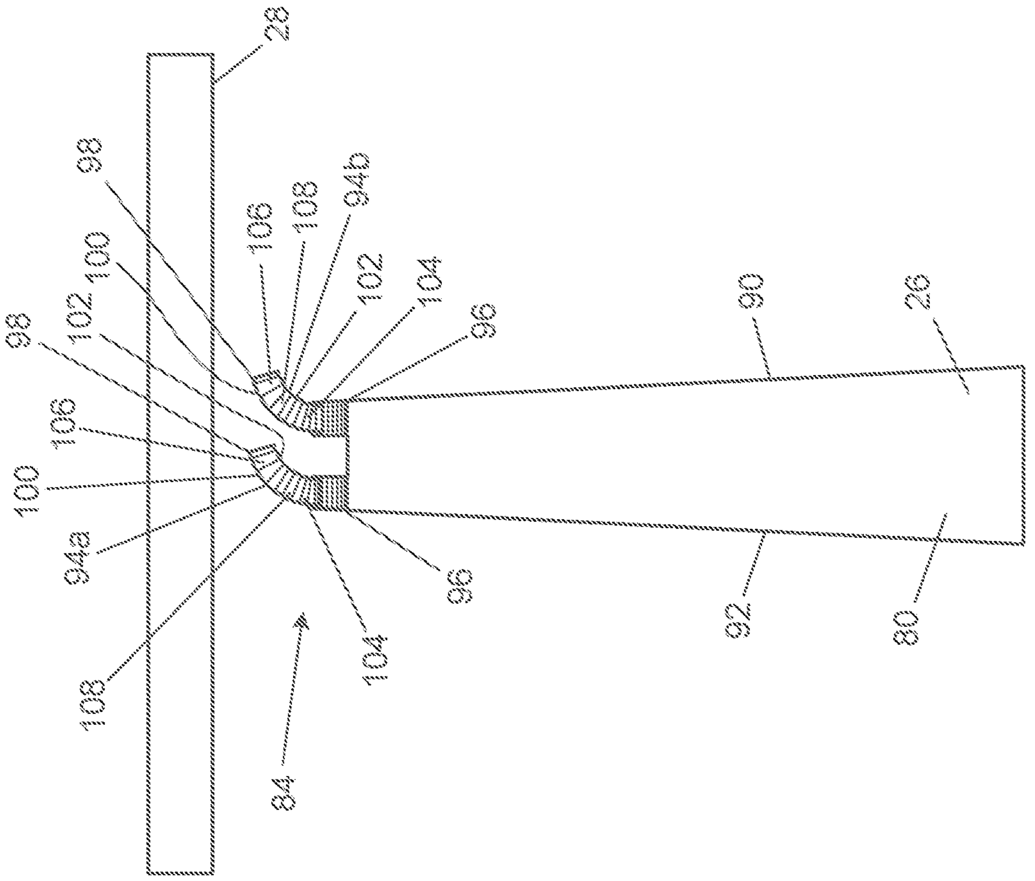
FIG. 6 is a cross-sectional view of another embodiment of the rotor and the rotor shroud.

FIG. 6 is a cross-sectional view of another embodiment of rotor 26 and rotor shroud 28. As shown in FIG. 6, rotor blade 80 of rotor 26 includes first tip seal 94*a* and second tip seal 94*b*. First tip seal 94*a* and second tip seal 94*b* each includes base end 96, distal end 98, first side 100, second side 102, first portion 104, second portion 106, and transition portion 108. First tip seal 94*a* and second tip seal 94*b* have a similar arrangement to each other.

Both first tip seal 94*a* and second tip seal 94*b* are connected to rotor blade 80 by base end 96. Distal end 98 is opposite base end 96 such that each of first tip seal 94*a* and second tip seal 94*b* extends from base end 96 to distal end 98. First side 100 of first tip seal 94*a* and second tip seal 94*b* extends from base end 96 to distal end 98. Second side 102 of first tip seal 94*a* and second tip seal 94*b* is opposite respective first side 100 and extends from base end 96 to distal end 98. Both first side 100 and second side 102 for each of tip seals 94 can extend from leading edge 86 to trailing edge 88 of rotor blade 80. In the embodiment of FIG. 6, first side 100 for both first tip seal 94*a* and second tip seal 94*b* is convex and second side 102 for both first tip seal 94*a* and second tip seal 94*b* is concave. First side 100 of first tip seal 94*a* is adjacent to and continuous with suction surface 92 of rotor blade 80. Second side 102 of second tip seal 94*b* is adjacent to and continuous with pressure surface 90 of rotor blade 80. Channel 95 extends on tip 84 between first tip seal 94*a* and second tip seal 94*b*. Second side 102 of first tip seal 94*a* faces first side 100 of second tip seal 94*b* with channel 95 therebetween. First tip seal 94*a* and second tip seal 94*b* are both curved toward a pressure side of rotor blade 80, which is opposite to a direction of rotation of rotor blade 80. Curving first tip seal 94*a* and second tip seal 94*b* in the opposite direction to the direction of rotation of rotor blade 80 reduces catching and wear between rotor shroud 28 and distal ends 98 of first tip seal 94*a* and second tip seal 94*b* should rotor blade 80 rub against rotor shroud 28.

First tip seal 94*a* and second tip seal 94*b* each includes first portion 104 with a first composition and second portion 106 with a second composition that is different from the first composition. In the embodiment of FIG. 6, first portion 104 forms base end 96 for both first tip seal 94*a* and second tip seal 94*b*. The first composition of first portion 104 can be a metallic material similar to a material making up the bulk of rotor blade 80. Second portion 106 forms distal end 98 for both first tip seal 94*a* and second tip seal 94*b*. The second composition of second portion 106 is a material that is softer, more elastic, and/or more abradable than the metallic material of the first composition of first portion 104. The material of the second composition can be metallic or non-metallic. The first composition of first portion 104 can also have a first coefficient of thermal expansion and the second composition of second portion 106 can have a second coefficient of thermal expansion that is greater than the first coefficient of thermal expansion.

With second portion 106 having a greater coefficient of thermal expansion than first portion 104, second portion 106 for first tip seal 94*a* and second tip seal 94*b* can increase in height as the temperature across rotor blade 80. As first tip seal 94*a* and second tip seal 94*b* increase in height, distal end 98 for each of first tip seal 94*a* and second tip seal 94*b* moves closer to rotor shroud 28 and reduces the gap between rotor blade 80 and rotor shroud 28. Decreasing the gap between rotor shroud 28 and rotor blades 80 reduces the amount of core flow F that leaks over tip 84 which increases the amount of core flow that is acted upon by rotor blades 80, which results in increased efficiency of cabin air compressor 10. Should distal end 98 of first tip seal 94*a* or second tip seal 94*b* contact rotor shroud 28, the softer, more elastic, and/or more abradable material of first portion 104 will reduce the likelihood of undesirable rub or wear between rotor blade 80 and rotor shroud 28.

As shown in FIG. 6, transition portion 108 is between first portion 104 and second portion 106 in first tip seal 94*a* and second tip seal 94*b*. Transition portion 108 comprises a mix of the first composition of first portion 104 and second composition of second portion 106. Transition portion 108 acts as a binding matrix that connects first portion 104 to second portion 106. First tip seal 94*a* and second tip seal 94*b* of FIG. 6 can be additively manufactured as a retro-fit onto a pre-existing rotor blade 80 or additively manufactured together with a new rotor blade 80.

Discussion of Possible Embodiments

The following are non-exclusive descriptions of possible embodiments of the present invention.

In one embodiment, a rotor blade for a turbomachine includes a base, a tip opposite the base in a spanwise direction, a leading edge, and a trailing edge opposite the leading edge in a chordwise direction. A pressure surface extends from the leading edge to the trailing edge, and extends from the base to the tip. A suction surface extends from the leading edge to the trailing edge, and extends from the base to the tip. The tip includes a tip seal with a base end connecting the tip seal to the rotor blade and a distal end opposite the base end. The tip seal also includes a first side extending from the base end to the distal end and a second side opposite the first side and extending from the base end to the distal end. The tip seal further includes a first portion with a first composition and a second portion with a second composition different from the first composition.

The rotor blade of the preceding paragraph can optionally include, additionally and/or alternatively, any one or more of the following features, configurations and/or additional components:

A further embodiment of the foregoing rotor blade, wherein the first composition is metallic and comprises a first coefficient of thermal expansion and the second composition is metallic and comprises a second coefficient of thermal expansion, and wherein the second coefficient of thermal expansion is greater than the first coefficient of thermal expansion.

A further embodiment of the foregoing rotor blade, wherein the first side of the tip seal is convex and formed by the first portion, and the second side is concave and formed by the second portion.

A further embodiment of the foregoing rotor blade, wherein the tip further comprises: a second tip seal comprising: a base end connecting the second tip seal to the rotor blade; a distal end opposite the base end of the second tip seal; a first side extending from the base end of the second tip seal to the distal end of the second tip seal; a second side opposite the first side of the second tip seal and extending from the base end of the second tip seal to the distal end of the second tip seal; a first portion with the first composition; and a second portion with the second composition, and wherein the first side of the second tip seal is convex and formed by the first portion of the second tip seal, and the second side of the second tip seal is concave and formed by the second portion of the second tip seal.

A further embodiment of the foregoing rotor blade, wherein the second side of the tip seal is adjacent to the pressure surface of the rotor blade, the second side of the second tip seal is adjacent to the suction surface of the rotor blade, and a channel extends on the tip from the leading edge of the rotor blade to the trailing edge of the rotor blade between the tip seal and the second tip seal.

A further embodiment of the foregoing rotor blade, wherein the first portion comprises a metallic material at the base end of the tip seal, and wherein the second portion comprises a material at the distal end that is softer than the metallic material of the first portion.

A further embodiment of the foregoing rotor blade, wherein the tip seal further comprises: a transition portion between the first portion and the second portion, wherein the transition portion comprises a mixed composition of the metallic material of the first portion and the material of the second portion.

A further embodiment of the foregoing rotor blade, wherein the tip further comprises: a second tip seal comprising: a base end connecting the second tip seal to the rotor blade; a distal end opposite the base end of the second tip seal; a first side extending from the base end of the second tip seal to the distal end of the second tip seal; a second side opposite the first side of the second tip seal and extending from the base end of the second tip seal to the distal end of the second tip seal; a first portion with the first composition; and a second portion with the second composition, and wherein the first portion of the second tip seal comprises a metallic material at the base end of the second tip seal, and wherein the second portion of the second tip seal comprises a material at the distal end of the second tip seal that is softer than the metallic material of the first portion of the second tip seal.

A further embodiment of the foregoing rotor blade, wherein the second tip seal further comprises: a transition portion between the first portion of the second tip seal and the second portion of the second tip seal, wherein the transition portion of the second tip seal comprises a mixed composition of the metallic material of the first portion of the second tip seal and the material of the second portion of the second tip seal.

A further embodiment of the foregoing rotor blade, wherein the tip further comprises: a channel extending from the leading edge of the rotor blade to the trailing edge of the rotor blade between the tip seal and the second tip seal.

A further embodiment of the foregoing rotor blade, wherein the first portion is metallic and the second portion is metallic and comprises a memory-shape alloy.

A further embodiment of the foregoing rotor blade, wherein the tip seal is additively manufactured to the rotor blade.

In another embodiment, a rotor blade for a turbomachine includes a base, a tip opposite the base in a spanwise direction, a leading edge, and a trailing edge opposite the leading edge in a chordwise direction. A pressure surface extends from the leading edge to the trailing edge, and extends from the base to the tip. A suction surface extends from the leading edge to the trailing edge, and extends from the base to the tip. The tip includes a tip seal additively manufactured to the rotor blade. The tip seal includes a first portion with a first composition and a second portion with a second composition different from the first composition.

The rotor blade of the preceding paragraph can optionally include, additionally and/or alternatively, any one or more of the following features, configurations and/or additional components:

A further embodiment of the foregoing rotor blade, wherein the tip seal comprises: a first height in the spanwise direction at a first temperature; and a second height in the spanwise direction at a second temperature, and wherein the second height is greater than the first height, and the second temperature is greater than the first temperature.

A further embodiment of the foregoing rotor blade, wherein the tip seal comprises: a base end connecting the tip seal to the rotor blade; a distal end opposite the base end; a convex side extending from the base end to the distal end; and a concave side opposite the convex side and extending from the base end to the distal end.

A further embodiment of the foregoing rotor blade, wherein the first portion forms the convex side and the second portion forms the concave side and the second portion comprises a coefficient of thermal expansion greater than a coefficient of thermal expansion of the first portion.

A further embodiment of the foregoing rotor blade, wherein the first portion forms the base end of the tip seal, and wherein the second portion forms the distal end of the tip seal, and the second composition is softer than the first composition.

A further embodiment of the foregoing rotor blade, wherein the tip seal further comprises: a transition portion between the first portion and the second portion, wherein the transition portion comprises a mix of the first composition and the second composition.

A further embodiment of the foregoing rotor blade, wherein the tip further comprises: a second tip seal comprising: a base end connecting the second tip seal to the rotor blade; a distal end opposite the base end of the second tip seal; a first side extending from the base end of the second tip seal to the distal end of the second tip seal; a second side opposite the first side of the second tip seal and extending from the base end of the second tip seal to the distal end of the second tip seal; a first portion with the first composition; and a second portion with the second composition, and a channel extending from the leading edge of the rotor blade to the trailing edge of the rotor blade between the tip seal and the second tip seal.

A further embodiment of the foregoing rotor blade, wherein the rotor blade is an impeller.

While the invention has been described with reference to an exemplary embodiment(s), it will be understood by those skilled in the art that various changes may be made and equivalents may be substituted for elements thereof without departing from the scope of the invention. For example, while rotor 26 has been described above as an impeller, rotor 26 can be an axial-flow rotor where core flow F enters rotor 26 as an axial flow and exits rotor 26 as an axial flow. In addition, many modifications may be made to adapt a particular situation or material to the teachings of the invention without departing from the essential scope thereof. For example, while rotor blades 80 with tip seals 94 have been disclosed above in cabin air compressor 10, tip seals 94 can be used on compressor rotors and turbine rotors in gas turbine engines, air cycle machines, or any other turbomachine. Therefore, it is intended that the invention not be limited to the particular embodiment(s) disclosed, but that the invention will include all embodiments falling within the scope of the appended claims.

The invention claimed is:

1. A rotor blade for a turbomachine comprising:

a base;

a tip opposite the base in a spanwise direction;

a leading edge;

a trailing edge opposite the leading edge in a chordwise direction;

a pressure surface extending from the leading edge to the trailing edge, and extending from the base to the tip; and a suction surface extending from the leading edge to the trailing edge, and extending from the base to the tip, and wherein the tip comprises:

a tip seal extending from the leading edge to the trailing edge of the rotor blade, the tip seal comprising:

a base end connecting the tip seal to the rotor blade;

a distal end opposite the base end;

a first side extending from the base end to the distal end, and extending from the leading edge to the trailing edge; and a second side opposite the first side and extending from the base end to the distal end, and extending from the leading edge to the trailing edge;

a first portion with a first composition, wherein the first portion extends from the leading edge to the trailing edge and from the base end to the distal end; and a second portion with a second composition different from the first composition, wherein the second portion is joined directly to the first portion and extends from the leading edge to the trailing edge and from the base end to the distal end;

wherein the first composition is metallic and comprises a first coefficient of thermal expansion and the second composition is metallic and comprises a second coefficient of thermal expansion, and wherein the second coefficient of thermal expansion is greater than the first coefficient of thermal expansion;

wherein the first side of the tip seal is formed by the first portion and is convex, and the second side is concave and formed by the second portion.

2. The rotor blade of claim 1, wherein the tip further comprises:

a second tip seal comprising:

a base end connecting the second tip seal to the rotor blade;

a distal end opposite the base end of the second tip seal;

a first side extending from the base end of the second tip seal to the distal end of the second tip seal;

a second side opposite the first side of the second tip seal and extending from the base end of the second tip seal to the distal end of the second tip seal;

a first portion with the first composition; and a second portion with the second composition, and wherein the first side of the second tip seal is convex and formed by the first portion of the second tip seal, and the second side of the second tip seal is concave and formed by the second portion of the second tip seal.

3. The rotor blade of claim 2, wherein the second side of the tip seal is adjacent to the pressure surface of the rotor blade, the second side of the second tip seal is adjacent to the suction surface of the rotor blade, and a channel extends on the tip from the leading edge of the rotor blade to the trailing edge of the rotor blade between the tip seal and the second tip seal.

4. The rotor blade of claim 1, wherein the first portion is metallic and the second portion is metallic and comprises a memory-shape alloy.

5. The rotor blade of claim 1, wherein the tip seal is additively manufactured to the rotor blade.

6. A rotor blade for a turbomachine comprising:

a base;

a tip opposite the base in a spanwise direction;

a leading edge;

a trailing edge opposite the leading edge in a chordwise direction;

a pressure surface extending from the leading edge to the trailing edge, and extending from the base to the tip; and a suction surface extending from the leading edge to the trailing edge, and extending from the base to the tip, and wherein the tip comprises:

a tip seal additively manufactured to the rotor blade, wherein the tip seal extends from the leading edge to the trailing edge, wherein the tip seal comprises:

a base end connecting the tip seal to the rotor blade;

a distal end opposite the base end;

a convex side extending from the base end to the distal end, and extending from the leading edge to the trailing edge, and wherein the convex side is convex as the convex side extends from the base end to the distal end;

a concave side opposite the convex side and extending from the base end to the distal end, and extending from the leading edge to the trailing edge, and wherein the concave side is concave as the concave side extends from the base end to the distal end;

a first portion with a first composition that extends from the leading edge to the trailing edge, extends from the base end to the distal end, and forms the convex side; and a second portion with a second composition different from the first composition, wherein the second portion is joined to the first portion such that the second portion is adjacent to the first portion, wherein the second portion extends from the leading edge to the trailing edge, extends from the base end to the distal end, and forms the concave side, and wherein the second portion comprises a coefficient of thermal expansion greater than a coefficient of thermal expansion of the first portion.

7. The rotor blade of claim 6, wherein the tip seal comprises:

a first height in the spanwise direction at a first temperature; and a second height in the spanwise direction at a second temperature, and wherein the second height is greater than the first height, and the second temperature is greater than the first temperature.

8. The rotor blade of claim 6, wherein the tip further comprises:

a second tip seal comprising:

a base end connecting the second tip seal to the rotor blade;

a distal end opposite the base end of the second tip seal;

a first side extending from the base end of the second tip seal to the distal end of the second tip seal;

a second side opposite the first side of the second tip seal and extending from the base end of the second tip seal to the distal end of the second tip seal;

a first portion with the first composition; and a second portion with the second composition, and a channel extending from the leading edge of the rotor blade to the trailing edge of the rotor blade between the tip seal and the second tip seal.

9. The rotor blade of claim 6, wherein the rotor blade is an impeller blade.

* * * * *